(12) United States Patent
Pang et al.

(10) Patent No.: US 11,929,484 B2
(45) Date of Patent: Mar. 12, 2024

(54) COMPOUND, PREPARATION METHOD THEREFORE, AND USE IN LITHIUM ION SECONDARY BATTERY

(71) Applicant: BTR NEW MATERIAL GROUP CO., LTD., Guangdong (CN)

(72) Inventors: Chunlei Pang, Guangdong (CN); Lijuan Qu, Guangdong (CN); Jianguo Ren, Guangdong (CN); Min Yue, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 296 days.

(21) Appl. No.: 16/476,471

(22) PCT Filed: Feb. 27, 2018

(86) PCT No.: PCT/CN2018/077445
§ 371 (c)(1),
(2) Date: Jul. 8, 2019

(87) PCT Pub. No.: WO2018/161821
PCT Pub. Date: Sep. 13, 2018

(65) Prior Publication Data
US 2020/0058924 A1    Feb. 20, 2020

(30) Foreign Application Priority Data
Mar. 6, 2017 (CN) .......................... 201710127281.0

(51) Int. Cl.
C01B 33/025 (2006.01)
C01B 33/12 (2006.01)
(Continued)

(52) U.S. Cl.
CPC ............ H01M 4/131 (2013.01); C01B 33/025 (2013.01); C01B 33/12 (2013.01); H01M 4/364 (2013.01);
(Continued)

(58) Field of Classification Search
None
See application file for complete search history.

(56) References Cited

U.S. PATENT DOCUMENTS

2014/0030599 A1* 1/2014 Lee ..................... H01M 4/485
429/231.8
2015/0221950 A1* 8/2015 Minami .............. H01M 4/5825
429/223
(Continued)

FOREIGN PATENT DOCUMENTS

| CN | 102214824 | 10/2011 |
| CN | 102374667 | 12/2013 |

(Continued)

OTHER PUBLICATIONS

Communication pursuant to Article 94(3) issued by the European Patent Office for Application No. 18 764 782.1, dated Dec. 3, 2020.
(Continued)

*Primary Examiner* — Jonathan Crepeau
*Assistant Examiner* — Angela J Martin
(74) *Attorney, Agent, or Firm* — McCoy Russell LLP

(57) ABSTRACT

Disclosed in the present application is a compound, comprising nano silicon, a lithium-containing compound and a carbon coating, or comprising nano silicon, silicon oxide, a lithium-containing compound, and a carbon coating. The method comprises: (1) solid-phase mixing of carbon coated silicon oxide with a lithium source; and (2) preforming heat-treatment of the pre-lithium precursor obtained in step (1) in a vacuum or non-oxidising atmosphere to obtain a (Continued)

compound. The method is simple, and has low equipment requirements and low costs; the obtained compound has a stable structure and the structure and properties do not deteriorate during long-term storage, a battery made of cathode material containing said compound exhibits high delithiation capacity, high initial coulombic efficiency, and good recycling properties, the charging capacity is over 1920 mAh/g, the discharging capacity is over 1768 mAh/g, and the initial capacity is over 90.2%.

16 Claims, 2 Drawing Sheets

(51) Int. Cl.
| | | |
|---|---|---|
| *H01M 4/131* | (2010.01) | |
| *H01M 4/36* | (2006.01) | |
| *H01M 4/38* | (2006.01) | |
| *H01M 4/48* | (2010.01) | |
| *H01M 4/485* | (2010.01) | |
| *H01M 4/587* | (2010.01) | |
| *H01M 10/0525* | (2010.01) | |
| *H01M 4/02* | (2006.01) | |

(52) U.S. Cl.
CPC ........... *H01M 4/366* (2013.01); *H01M 4/386* (2013.01); *H01M 4/483* (2013.01); *H01M 4/485* (2013.01); *H01M 4/587* (2013.01); *H01M 10/0525* (2013.01); *C01P 2004/03* (2013.01); *C01P 2004/80* (2013.01); *C01P 2006/12* (2013.01); *C01P 2006/40* (2013.01); *H01M 2004/027* (2013.01)

(56) References Cited

U.S. PATENT DOCUMENTS

| | | |
|---|---|---|
| 2015/0280223 A1 | 10/2015 | Chang et al. |
| 2016/0260967 A1 | 9/2016 | Matus et al. |

FOREIGN PATENT DOCUMENTS

| | | |
|---|---|---|
| CN | 103474631 | 12/2013 |
| CN | 103474667 A | 12/2013 |
| CN | 106067543 A | 11/2016 |
| CN | 106356508 A | 1/2017 |
| CN | 106816594 | 6/2017 |
| EP | 2372817 A1 | 10/2011 |
| JP | 2007059213 A | 3/2007 |
| JP | 2011222151 A | 11/2011 |
| JP | 2016192385 A | 11/2016 |
| KR | 20160045378 A | 4/2016 |
| WO | 2016121324 A1 | 8/2016 |
| WO | 2017022734 A1 | 2/2017 |

OTHER PUBLICATIONS

Yang, et al., "SiOx-based anodes for secondary lithium batteries", Solid State Ionics 152-153 (2002)125-129.
Communication and extended European Search Report issued by the European Patent Office for Application No. 18764782.1, dated Feb. 20, 2014.
Zhang et al., "Preparation of nanographite sheets supported Si nanoparticles by in situ reduction of fumed SiO2 with magnesium for lithium ion battery", Journal of Power Sources 281 (2015) 425-431.

* cited by examiner

COMPOUND, PREPARATION METHOD THEREFORE, AND USE IN LITHIUM ION SECONDARY BATTERY

TECHNICAL FIELD

The present disclosure belongs to the field of anode materials for lithium-ion batteries, and relates to a composite, a preparation method and a use thereof, for instance a Si—O—C—Li composite, a preparation method thereof and a use in lithium-ion secondary batteries.

BACKGROUND

Lithium-ion secondary batteries are widely used in portable electronic products, electric vehicles and energy storage. However, during the initial charge, electrolyte is unstable and forms a SEI film on the surface of electrodes, consuming a large amount of lithium, resulting in low initial coulombic efficiency. For graphite, 5-20% of lithium is used to form the SEI film in the first cycle, while Si, Sn and $SiO_x$ need to consume 20-50% of lithium. In this regard, researchers have made a series of optimized designs, such as preparation of nanowires, porous nanostructures and carbon coating and the like. Although the cycling performance is improved, the contact area with the electrolyte is increased, the initial efficiency is reduced, cathode material is consumed in large amount, and energy density is lowered. Obviously, it is imperative to carry out lithium supplement to anode materials in advance.

At present, there are mainly three methods for doping $SiO_x$ with lithium: directly coating a lithium layer on the surface of pole pieces, electrochemically plating lithium on the surface of pole pieces, or mixing $SiO_x$ with a lithium compound followed by calcination. The lithium source selected is mainly concentrated on metallic lithium, and some have tried LiOH and LiH.

CN 1246917C discloses a lithium-containing silicon oxide powder and a production method thereof, which comprises calcining a mixture of raw material powder capable of producing SiO gas with metallic lithium or lithium compound powder at 800 to 1300° C. to obtain a lithium-containing silicon oxide powder, which can increase the capacity and the initial efficiency of the material. However, the introduction of a lithium source during the synthesis stage of raw materials greatly promotes growth of Si grains and reduces cycling.

CN 100434362C discloses a method for preparing a silicon/lithium-rich phase composite anode material for lithium secondary battery by high-energy ball milling, in which silicon monoxide and metallic lithium are high-energy ball milled, and then heat-treated in vacuum to obtain the silicon/lithium-rich phase composite anode material, with its specific capacity and cycling improved. However, the Li2O produced by directly reacting bare silicon monoxide with metallic lithium is easy to absorb moisture and react, which affects the late stability of the material, and makes mass production difficult to achieve.

CN 103840136A discloses an anode material for electricity storage devices and a preparation method thereof. In the presence of a solvent, a Si-based material capable of occluding and releasing lithium ions is blended with a lithium metal by mixing, and then heat-treated to form lithium silicate to produce an anode material pre-doped with lithium. However, the produced lithium silicate phase that is not subjected to secondary treatment shows strong alkalinity, and it is difficult to process in the later stage and cannot be used in bulk.

SUMMARY

The following is a summary of the subject matter that is described in greater detail by the present disclosure. The summary is not intended to be limiting as to the protection scope of the claims.

It's an object of the present disclosure to provide a composite, a preparation method thereof and an anode material and a lithium-ion secondary battery comprising the same. The method of the present disclosure is simple, and has low requirements on equipments and low cost, and the composite obtained therefrom has a stable structure, which can effectively avoid the failure of active ingredients due to infiltration of components such as air into the interior of particles, and the structure and properties of the composite do not deteriorate during long-term storage. A battery made of the anode material containing the composite exhibits high delithiation capacity, high initial coulombic efficiency and good cycling performance, which has a charge capacity of 1920 mAh/g or more, a discharge capacity of 1768 mAh/g or more and an initial efficiency of 90.2% or more.

In order to achieve the above object, the present disclosure adopts the following technical solutions:

In a first aspect, the present disclosure provides a composite, and more particularly relates to a Si—O—C—Li composite, which comprises nano-silicon, a lithium-containing compound and a carbon coating.

As a preferred technical solution of the composite of the present disclosure, the composite further comprises a silicon oxide, that is, the composite comprises nano-silicon, a silicon oxide, a lithium-containing compound and a carbon coating.

In this preferred technical solution, the silicon oxide has a chemical composition of $SiO_x$, in which 0<x<2. Wherein, x may possess a value of 0.1, 0.2, 0.5, 0.6, 0.8, 1, 1.2, 1.5, 1.75 or 1.8 and the like.

In the present disclosure, the nano-silicon is grown from in-situ reduction of a carbon-coated silicon oxide, and the carbon-coated silicon oxide comprises a silicon oxide and a carbon coating coated on the surface of the silicon oxide.

In the present disclosure, a carbon-coated silicon oxide and a reducing agent are used as raw materials. Through the steps such as primary treatment and heat treatment and the like, the reducing agent undergoes a redox reaction with the silicon oxide in the interior of the carbon coating, and nano-silicon is grown from in-situ reduction, and a lithium-containing compound is produced.

In the present disclosure, since the nano-silicon is grown from in-situ reduction of a carbon-coated silicon oxide, there is no clear interface between the nano-silicon and the lithium-containing compound obtained by the reaction, and this structural feature is closely related to the preparation method of the present disclosure.

The method of the present disclosure can effectively reduce or even avoid the agglomeration problem among nano-silicons, thereby reducing the silicon expansion problem in the process of application to a battery, and improving the cycle life of the battery.

The nano-silicon of the present disclosure has a diameter in nanoscale.

In the present disclosure, when the composite comprises nano-silicon, a lithium-containing compound and a carbon coating, the composite has such a structure that: nano-silicon is dispersed in the lithium-containing compound served as a matrix in a sea-island form to form fusion particles, with the carbon coating coated on the surface of the fusion particles (see FIG. 1 for a schematic structural view of the composite).

In the present disclosure, the expression "nano-silicon is dispersed in the lithium-containing compound served as a matrix in a sea-island form" means that all directions of the nano-silicon are surrounded by the lithium-containing compound that is served as a matrix.

As a preferred technical solution of the composite of the present disclosure, when the composite further comprises a silicon oxide, i.e., the composite comprises nano-silicon, a silicon oxide, a lithium-containing compound and a carbon coating, the composite has such a structure that: nano-silicon is dispersed in the lithium-containing compound to form fusion particles, and the fusion particles are dispersed in the silicon oxide served as a matrix in a sea-island form to form composite particles, with the carbon coating coated on the surface of the composite particles (see FIG. 2 for a schematic structural view of the composite).

In the present preferred technical solution, the expression "the fusion particles are dispersed in the silicon oxide served as a matrix in a sea-island form" means that all directions of the fusion particles are surrounded by the silicon oxide that is served as a matrix.

In the present preferred technical solution, since the nano-silicon is grown from in-situ reduction of a carbon-coated silicon oxide, there is no clear interface between the nano-silicon and the lithium-containing compound obtained by the reaction, and this structural feature is closely related to the preparation method of the present disclosure.

In the present disclosure, the lithium-containing compound refers to any one selected from the group consisting of Li—Si compounds, Li—O compounds, silicon-oxygen-lithium compounds (Li—Si—O compounds), and a mixture of at least two selected therefrom, preferably silicon-oxygen-lithium compounds.

Preferably, the silicon-oxygen-lithium compound comprises any one selected from the group consisting of $Li_2SiO_3$, $Li_4SiO_4$, $Li_2Si_2O_5$, $Li_2Si_3O_7$, and a mixture of at least two selected therefrom; e.g. a mixture of $Li_2SiO_3$ and $Li_4SiO_4$, a mixture of $Li_2SiO_3$ and $Li_2Si_2O_5$, a mixture of $Li_4SiO_4$ and $Li_2Si_3O_7$, a mixture of $Li_2SiO_3$, $Li_2Si_2O_5$ and $Li_2Si_3O_7$ and the like.

Preferably, the silicon-oxygen-lithium compound is partially crystalline.

Preferably, the carbon coating has a thickness of 3-800 nm, e.g. 3 nm, 5 nm, 10 nm, 20 nm, 30 nm, 40 nm, 50 nm, 60 nm, 70 nm, 85 nm, 90 nm, 100 nm, 110 nm, 120 nm, 135 nm, 145 nm, 160 nm, 175 nm, 190 nm, 200 nm, 215 nm, 225 nm, 245 nm, 260 nm, 280 nm, 300 nm, 320 nm, 340 nm, 360 nm, 380 nm, 400 nm, 415 nm, 430 nm, 450 nm, 475 nm, 500 nm, 520 nm, 540 nm, 560 nm, 580 nm, 600 nm, 625 nm, 650 nm, 680 nm, 700 nm, 730 nm, 750 nm, 775 nm or 800 nm and the like, preferably 10-500 nm.

Preferably, the carbon coating contains hard carbon.

Preferably, the carbon coating comprises a carbon matrix and carbon nanotubes and/or graphene sheets embedded in the carbon matrix, and the carbon matrix is obtained by cracking an organic carbon source via carbonization treatment.

Preferably, based on 100 wt % of the total mass of the carbon coating, the carbon nanotubes and/or graphene sheets in the carbon coating have a mass percent of 0.05-20 wt %, e.g. 0.05 wt %, 0.1 wt %, 0.2 wt %, 0.25 wt %, 0.4 wt %, 0.55 wt %, 0.6 wt %, 0.8 wt %, 1 wt %, 1.5 wt %, 2 wt %, 3 wt %, 3.5 wt %, 4 wt %, 5 wt %, 6 wt %, 7 wt %, 7.5 wt %, 8.5 wt %, 9 wt %, 10 wt %, 11 wt %, 12.5 wt %, 14 wt %, 15 wt %, 16 wt %, 17 wt %, 18 wt %, 19 wt % or 20 wt % and the like.

Preferably, based on 100 wt % of the total mass of the composite, the carbon coating has a mass percent of 0.1-50 wt %, e.g. 0.1 wt %, 0.3 wt %, 0.5 wt %, 1 wt %, 2 wt %, 2.5 wt %, 3 wt %, 5 wt %, 7 wt %, 10 wt %, 12 wt %, 14 wt %, 16 wt %, 18 wt %, 20 wt %, 23 wt %, 25 wt %, 30 wt %, 33 wt %, 36 wt %, 40 wt %, 42 wt %, 45 wt %, 48 wt % or 50 wt % and the like, further preferably 1-20 wt %.

The composite provided by the present disclosure is structurally stable during long-term storage in air, and the "long-term" means that the time is 7 days or more.

In a second aspect, the present disclosure provides a preparation method of the composite according to the first aspect, and the method comprises the following steps:

(1) blending a carbon-coated silicon oxide and a lithium source by solid-phase mixing mode to implement primary treatment to form a pre-lithium precursor; and (2) heat-treating the pre-lithium precursor in vacuum or a non-oxidizing atmosphere to implement structural adjustment and secondary treatment to form the composite.

In the present disclosure, the carbon-coated silicon oxide in step (1) comprises a silicon oxide and a carbon coating coated on the surface of the silicon oxide.

In step (1) of the present disclosure, the lithium source undergoes a redox reaction with the silicon oxide in the interior of the carbon coating, and in-situ redox growth results in nano-silicon and a lithium-containing compound, thus, there is no clear interface between the two reaction products.

The method of the present disclosure can effectively reduce or even avoid the agglomeration problem among nano-silicons, thereby reducing the silicon expansion problem in the process of application to batteries, and improving the cycle life of the batteries.

As a preferred technical solution, the method further comprises a step of subjecting the composite to surface treatment after the heat treatment in step (2) to obtain a surface-treated composite.

Preferably, the manner of the surface treatment is any one selected from the group consisting of impurity removal, coating, cladding, film plating, spraying, and a combination of at least two selected therefrom.

Preferably, the manner of the impurity removal is any one selected from the group consisting of washing, impregnation, and a combination of at least two selected therefrom.

The step of surface treatment can remove the residual lithium or lithium-containing compound on the surface of the composite obtained in the step (2), or compound the residual lithium or lithium-containing compound on the surface to the interior.

The manner in which the residual lithium or the lithium-containing compound can be removed, such as impurity removal mode (washing or impregnation, and the like), for example, may be performed by impregnating the composite into the impurity removing solution.

The manner in which the residual lithium or the lithium-containing compound can be compounded to the interior is exemplified as coating, cladding, film plating or spraying and the like. The substance coated, cladded, film plated or sprayed may be but not limited to a carbon layer, a polymer and the like.

Preferably, the silicon oxide has a chemical composition of $SiO_x$, in which $0<x<2$, exemplarily, x may possess a value of 0.3, 0.5, 0.8, 1, 1.2, 1.5, 1.75 or 1.8 and the like.

Preferably, the carbon coating has a thickness of 3-800 nm, e.g. 3 nm, 10 nm, 20 nm, 40 nm, 50 nm, 70 nm, 100 nm, 120 nm, 140 nm, 200 nm, 220 nm, 240 nm, 265 nm, 290 nm, 320 nm, 350 nm, 400 nm, 425 nm, 450 nm, 480 nm, 500 nm, 550 nm, 575 nm, 600 nm, 650 nm, 675 nm, 700 nm, 750 nm or 800 nm and the like, preferably 10-500 nm.

Preferably, the carbon coating contains hard carbon.

Preferably, the carbon coating comprises a carbon matrix and carbon nanotubes and/or graphene sheets embedded in the carbon matrix, and the carbon matrix is obtained by cracking an organic carbon source via carbonization treatment.

The "carbon nanotubes and/or graphene sheets" as used in the present disclosure means that it may be carbon nanotubes, graphene sheets, or a mixture of carbon nanotubes and graphene sheets.

Preferably, the organic carbon source comprises any one selected from the group consisting of phenolic resin, epoxy resin, polyurethane, asphalt, coal tar, polythiophene, polyolefin, saccharides, polyhydric alcohols, phenolic resin derivatives, epoxy resin derivatives, polyurethane derivatives, asphalt derivatives, coal tar derivatives, polythiophene derivatives, saccharides derivatives, polyhydric alcohols derivatives, and a combination of at least two selected therefrom.

Preferably, the temperature of the carbonization treatment is 500-1300° C., e.g. 500° C., 550° C., 600° C., 625° C., 650° C., 700° C., 750° C., 800° C., 900° C., 1000° C., 1100° C., 1150° C., 1250° C. or 1300° C. and the like, preferably 600-1000° C.

Preferably, the time for the carbonization treatment is 1-10 h, e.g. 1 h, 1.5 h, 2 h, 3 h, 4 h, 5 h, 6 h, 8 h, 9 h or 10 h and the like, preferably 2-6 h.

Preferably, based on 100 wt % of the total mass of the carbon coating, the carbon nanotubes and/or graphene sheets in the carbon coating has a mass percent of 0.05-20 wt %, e.g. 0.05 wt %, 0.1 wt %, 0.3 wt %, 0.5 wt %, 0.8 wt %, 1 wt %, 1.5 wt %, 2 wt %, 3 wt %, 4 wt %, 5 wt %, 6 wt %, 7 wt %, 7.5 wt %, 8.5 wt %, 9 wt %, 10 wt %, 11 wt %, 12.5 wt %, 14 wt %, 15 wt %, 16 wt %, 17 wt %, 18 wt %, 19 wt % or 20 wt % and the like.

Preferably, in the carbon-coated silicon oxide in step (1), the mass ratio of the silicon oxide to the carbon coating is 100:(2-15), e.g. 100:2, 100:3, 100:5, 100:6.5, 100:8, 100:9, 100:10, 100:12, 100:13, 100:14 or 100:15 and the like.

Preferably, the lithium source in step (1) is lithium-containing compound with strong alkalinity, lithium-containing compound with reducibility, or elemental lithium, in which "lithium-containing compound with strong alkalinity" means that 1 M of the aqueous solution of the lithium-containing compound has a pH greater than 10, e.g. $LiNH_2$, $Li_2CO_3$, lithium oxide, lithium metal, lithium hydride, lithium hydroxide, lithium acetate, lithium oxalate, lithium formate, phenyl lithium, alkyl lithium, t-butyl lithium, n-butyl lithium or lithium t-butoxide and the like. However, it does not limit to the above-listed substances, other substances which can achieve the same effect can also be used in the present disclosure.

Preferably, the mass ratio of the carbon-coated silicon oxide to the lithium source in step (1) is 1:(0.01-0.3), preferably 1:(0.05-0.2), e.g. 1:0.01, 1:0.03, 1:0.05, 1:0.08, 1:0.1, 1:0.12, 1:0.15, 1:0.17, 1:0.2, 1:0.23, 1:0.25, 1:0.26, 1:0.28 or 1:0.3 and the like.

Preferably, the solid-phase mixing mode in step (1) comprises any one selected from the group consisting of ball milling, VC mixing, fusion, mixing, kneading, dispersion, and a combination of at least two selected therefrom.

Preferably, the time for the blending in step (1) is 2-12 h, e.g. 2 h, 2.5 h, 3 h, 3.5 h, 4h, 5 h, 5.5 h, 6 h, 8 h, 9 h, 10 h or 12 h and the like.

Preferably, the mixing is performed in vacuum condition.

Preferably, the apparatus used for the dispersion is a high-speed disperser.

The step (1) of the present disclosure comprises blending in solid-phase mixing mode, so that the lithium source is sufficiently contacted with the carbon-coated silicon oxide, and the dispersion is more uniform, and primary treatment is implemented to obtain a pre-lithium precursor.

Preferably, the non-oxidizing atmosphere in step (2) comprises any one selected from the group consisting of hydrogen atmosphere, nitrogen atmosphere, helium atmosphere, neon atmosphere, argon atmosphere, krypton atmosphere, xenon atmosphere, and a combination of at least two selected therefrom.

Preferably, the temperature of the heat-treating in step (2) is 160-1000° C., e.g. 160° C., 200° C., 230° C., 265° C., 300° C., 350° C., 450° C., 500° C., 550° C., 600° C., 700° C., 750° C., 850° C., 900° C. or 1000° C. and the like, preferably 300-900° C., further preferably 400-860° C.

Preferably, the time for the heat-treating in step (2) is 2-12 h, e.g. 2 h, 3 h, 3.5 h, 4 h, 5 h, 5.5 h, 6 h, 8 h, 9.5 h, 10.5 h, 11 h or 12 h and the like, preferably 2-9 h.

In the present disclosure, via the heat treatment in vacuum or non-oxidizing atmosphere in step (2), the lithium source infiltrates into the interior of the carbon-coated silicon oxide to react in situ with the silicon oxide to produce nano-silicon and generate a lithium-containing compound, so that the substance species in the interior of the carbon coating are adjusted, moreover, the adjustment of the product structure is also achieved to obtain the composite of the present disclosure (which is a Si—O—C—Li composite).

Preferably, a surface treatment of the composite is continued, to obtain a surface-treated composite (which is also a Si—O—C—Li composite).

When the composite comprises nano-silicon, a silicon oxide, a lithium-containing compound and a carbon coating, it indicates that the silicon oxide in the raw material carbon-coated silicon oxide is not completely reacted, with surplus silicon oxide.

When the composite comprises nano-silicon, a lithium-containing compound and a carbon coating, and does not comprise silicon oxide, it indicates that the silicon oxide in the raw material carbon-coated silicon oxide is completely reacted, without surplus silicon oxide.

In a third aspect, the present disclosure provides an anode material, which comprises the composite according to the first aspect.

In a fourth aspect, the present disclosure provides a use of the composite according to the first aspect in lithium-ion secondary batteries.

The lithium-ion secondary battery comprises the anode material according to the third aspect. The anode material may be used in combination with a carbon material capable of intercalating and deintercalating lithium ions.

As compared to the prior art, the present disclosure has the following beneficial effects:

(1) In the present disclosure, a composite having excellent properties is prepared by mixing a carbon-coated silicon oxide with a specific lithium source by solid phase mixing, then performing heat treatment under specific conditions, and finally performing surface treatment. The method of the present disclosure has a green and environment-friendly working process, no formation of toxic and harmful intermediate products, easily obtainable raw materials, simple process, low requirements on equipments, low cost and is easy for large-scale commercial production.

(2) The Si—O—C—Li composite of the present disclosure is divided into the two following structures according to whether silicon oxide is contained or not: when the composite comprises nano-silicon, a lithium-containing compound and a carbon coating, the composite has such a structure that: nano-silicon is dispersed in the lithium-containing compound served as a matrix in a sea-island form to form fusion particles, with the carbon coating coated on the surface of the fusion particles; when the composite comprises nano-silicon, a silicon oxide, a lithium-containing compound and a carbon coating, the composite has such a structure that: nano-silicon is dispersed in the lithium-containing compound to form fusion particles, and the fusion particles are dispersed in a silicon oxide served as a matrix in a sea-island form to form composite particles, with the carbon coating coated on the surface of the composite particles.

In the present disclosure, nano-silicon is dispersed in the lithium-containing compound served as a matrix in a sea-island form; or nano-silicon is first dispersed in the lithium-containing compound, and then the obtained fusion particles are dispersed in a silicon oxide served as a matrix in a sea-island form. In the two structures, nano-Si is embedded in the nearby matrix, and will not agglomerate with each other, let alone directly exposed, which can alleviate the volume expansion problem of silicon. The composite of the present disclosure has a stable structure, which can avoid the failure of active ingredients due to the infiltration of components such as air into the interior of the particles, and the structure and properties of the composite will not deteriorate during long-term storage.

(3) The composite of the present disclosure has a stable structure and excellent performances, and is particularly suitable for use in anode materials for lithium ion batteries. The present disclosure uses a lithium-containing compound formed in situ to isolate the electrolyte, and the irreversible lithium-consuming phase in the material is pre-reacted. On one hand, irreversible lithium loss during the initial charge-discharge process can be reduced, and the capacity and initial coulombic efficiency are increased; on the other hand, the structure of the composite of the present disclosure can effectively suppress the expansion problem of Si when used in a lithium ion battery, reduce the expansion of the pole pieces, and prolong the cycle life. A battery made of the anode material containing the composite exhibits high delithiation capacity, high initial coulombic efficiency and excellent cycling performance, which has a charge capacity of 1920 mAh/g or more, a discharge capacity of 1768 mAh/g or more, and an initial efficiency of 90.2% or more.

(4) In addition, the anode material comprising the composite of the present disclosure can also be used in combination with other anode materials having the ability to intercalate and deintercalate lithium, and has a good application prospect.

DETAILED DESCRIPTION

The technical solutions of the present disclosure will be further described below in conjunction with the accompanying drawings and specific embodiments.

EXAMPLE 1

50 g of $SiO_x$ (x=0.95) with carbon coating on the surface and 12.5 g of lithium source $LiNH_2$ were high-speed dispersed until homogeneously mixed; then the mixture was heat treated at 500° C. for 2 h in an argon atmosphere, naturally cooled to room temperature to take out a composite. Then impurity removal was performed by means of impregnation, and the composite was dried to obtain a surface-treated composite.

Figure 1:
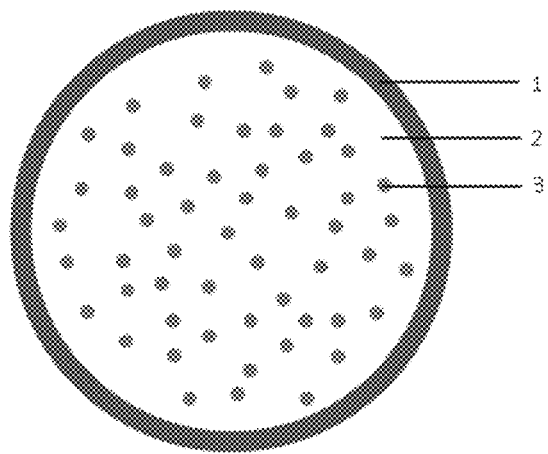
FIG. 1 is a schematic structural view of a composite comprising nano-silicon, a lithium-containing compound and a carbon coating, wherein reference number 1 represents a carbon coating, reference number 2 represents a lithium-containing compound, and reference number 3 represents nano-silicon.
Figure 2:
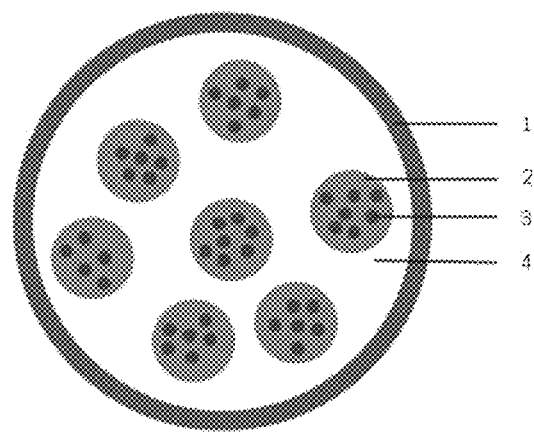
FIG. 2 is a schematic structural view of a composite comprising nano-silicon, a silicon oxide, a lithium-containing compound and a carbon coating, wherein reference number 1 represents a carbon coating, reference number 2 represents a lithium-containing compound, reference number 3 represents nano-silicon, and reference number 4 represents a silicon oxide.
Figure 3:
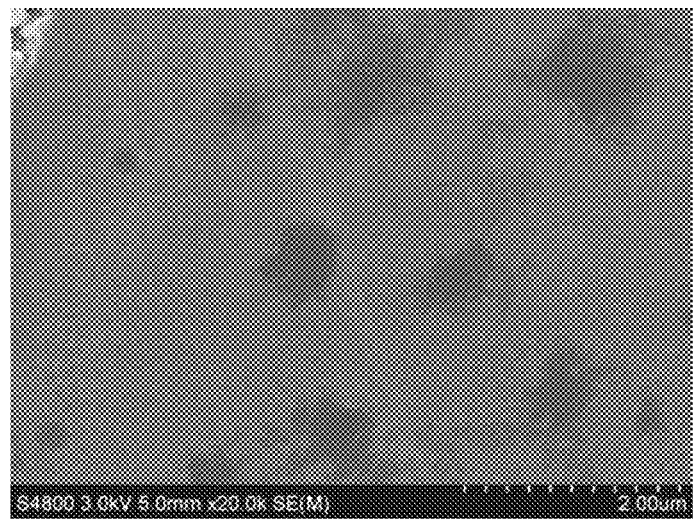
FIG. 3 is a SEM image of the composite obtained in Example 1 of the present disclosure.

FIG. 3 is a SEM image of the composite obtained in the present example. It can be seen from the figure that dark regions formed by a nano-silicon inlaid lithium-containing compound were uniformly distributed in the particle, which formed a sea-island structure in which the lithium-containing compound inlaid with nano-silicon was served as islands, and silicon oxide was served as the sea.

EXAMPLE 2

500 g of $SiO_x$ (x=0.95) with carbon coating on the surface and 125 g of lithium source $Li_2CO_3$ were high-speed dispersed until homogeneously mixed; then the mixture was heat treated at 500° C. for 2 h in an argon atmosphere, naturally cooled to room temperature to take out a composite. Then impurity removal was performed by means of impregnation, and the composite was dried to obtain a surface-treated composite.

EXAMPLE 3

50 g of $SiO_x$ (x=0.95) with carbon coating on the surface and 10.8 g of lithium metal powder as a lithium source were mixed in a vacuum state for 3 h; then the mixture was heat treated at 500° C. for 2 h in an argon atmosphere, naturally cooled to room temperature to take out a composite. Then impurity removal was performed by means of impregnation, and the composite was dried to obtain a surface-treated composite.

EXAMPLE 4

500 g of $SiO_x$ (x=0.95) with carbon coating on the surface and 108 g of lithium oxide powder as a lithium source were mixed in a vacuum state for 3 h; then the mixture was heat treated at 500° C. for 2 h in an argon atmosphere, naturally cooled to room temperature to take out a composite. Then impurity removal was performed by means of impregnation, and the composite was dried to obtain a surface-treated composite.

EXAMPLE 5

500 g of $SiO_x$ (x=0.5) with carbon coating on the surface and 108 g of lithium metal powder as a lithium source were ball milled for 8 h; then the mixture was heat treated at 800° C. for 1.5 h in an argon atmosphere, naturally cooled to room temperature to take out a composite. Then impurity removal was performed by means of impregnation, and the composite was dried to obtain a surface-treated composite.

EXAMPLE 6

100 g of $SiO_x$ (x=1.5) with carbon coating on the surface and 30 g of lithium source $LiNH_2$ were high-speed dispersed until homogeneously mixed; then the mixture was heat treated at 300° C. for 6 h in a nitrogen atmosphere, naturally cooled to room temperature to take out a composite. Then impurity removal was performed by means of impregnation, and the composite was dried to obtain a surface-treated composite.

EXAMPLE 7

200 g of SiO (x=0.7) with carbon coating on the surface and 45 g of lithium source $Li_2CO_3$ were VC mixed for 2 h; then the mixture was heat treated at 900° C. for 2 h in an argon atmosphere, naturally cooled to room temperature to take out a composite. Then a layer of polymer film was sprayed on the surface of the composite, filtered and dried to obtain a surface-treated composite.

COMPARISON EXAMPLE 1

50 g of SiO was mixed with 6.3 g of citric acid homogeneously, and then the mixture was fired in a nitrogen atmosphere box-type furnace at a firing temperature of 800° C. After 2 h of heat preservation, a SiO raw material having a carbon coating layer was obtained by naturally cooling to room temperature.

Electrochemical Performance Test

The anode materials for lithium ion batteries prepared in Examples 1-7 and the Comparative Example were used as active materials respectively, and PI was used as a binder. After conductive carbon black was added, a slurry was obtained by stirring and then coated on a copper foil, and finally anode plates were obtained by oven drying and rolling, wherein active material : conductive agent : binder=85:15:10. Lithium metal sheet was used as the counter electrode, PP/PE was used as the diaphragm, $LiPF_6$/EC+DEC+DMC (the volume ratio of EC, DEC and DMC is 1:1:1) was used as the electrolyte, and simulated batteries were assembled in a glove box filled with argon. The electrochemical performances of the batteries were tested with a LAND or Xinwei 5V/10 mA battery tester, in which the charge-discharge voltage was set as 1.5V and the charge-discharge rate was set as 0.1C, and the test results were shown in Table 1.

TABLE 1

| | Specific surface area ($m^2$/g) | Charge capacity (mAh/g) | Discharge capacity (mAh/g) | Initial efficiency (%) |
| --- | --- | --- | --- | --- |
| Comparison Example 1 | 2.7 | 1892 | 1400 | 74 |
| Example 1 | 1.8 | 2042 | 1850 | 90.6 |
| Example 2 | 2.3 | 2006 | 1810 | 90.2 |
| Example 3 | 1.9 | 2044 | 1860 | 91.0 |
| Example 4 | 2.0 | 2026 | 1840 | 90.8 |

TABLE 1-continued

| | Specific surface area ($m^2$/g) | Charge capacity (mAh/g) | Discharge capacity (mAh/g) | Initial efficiency (%) |
| --- | --- | --- | --- | --- |
| Example 5 | 1.6 | 2001 | 1842 | 92.1 |
| Example 6 | 2.6 | 2080 | 1868 | 89.8 |
| Example 7 | 2.0 | 1920 | 1768 | 92.1 |

As can be seen from the comparison of Examples 1-7 and Comparative Example 1, the lithium-ion secondary batteries made of the anode materials containing the composite of the present disclosure exhibit high delithiation capacity, high initial coulombic efficiency and excellent cycling performance, which has a charge capacity of 1920 mAh/g or more, a discharge capacity of 1768 mAh/g or more and an initial efficiency of 90.2% or more, and the electrochemical performances are significantly superior to those of the battery made of a conventional carbon-coated SiO anode material.

The Applicant claims that the detailed methods of the present disclosure is described by the above-described embodiments, but the present invention is not limited to the detailed methods described above, that is, it does not mean that the present invention must be implemented by the above detailed methods. It is to be understood by those skilled in the art that any modifications of the present disclosure, equivalent substitution of the various materials of the present disclosure, and the addition of auxiliary components, the selection of the specific manner and the like, are all within the protection scope and disclosure scope of the present invention.

What is claimed is:

1. A composite, which is a Si—O—C—Li composite comprising nano-silicon, a silicon-oxygen-lithium compound selected from the group consisting of Li2SiO3, Li4SiO4, Li2Si2O5, Li2Si3O7 and combinations thereof, silicon oxide and a carbon coating,
    wherein the silicon-oxygen-lithium compound is partially crystalline, the nano-silicon is dispersed in the silicon-oxygen-lithium compound to form fusion particles of the nano-silicon and the silicon-oxygen-lithium compound without clear interface between the nano-silicon and the silicon-oxygen-lithium compound, and the fusion particles are uniformly dispersed in the silicon oxide to form a composite particle wherein all directions of the fusion particles are surrounded by the silicon oxide matrix, forming a sea-island structure with the fusion particles as islands and with the silicon oxide as the sea, with the carbon coating coated on the surface of the composite particles;
    wherein the nano-silicon and the silicon-oxygen-lithium compound are produced by in-situ redox growth.

2. The composite according to claim 1, wherein the silicon oxide has a chemical composition of SiOx, in which 0<x<2.

3. The composite according to claim 1, wherein the nano-silicon is grown from in-situ reduction of a carbon-coated silicon oxide, and the carbon-coated silicon oxide comprises a silicon oxide and a carbon coating coated on the surface of the silicon oxide.

4. The composite according to claim 1, wherein the carbon coating comprises a carbon matrix and carbon nanotubes and/or graphene sheets embedded in the carbon matrix, and the carbon matrix is obtained by cracking an organic carbon source via carbonization treatment.

5. The composite according to claim 1, wherein based on 100 wt % of the total mass of the composite, the carbon coating has a mass percent of 0.1-50 wt %.

6. A preparation method of a composite, wherein the composite is a Si—O—C—Li composite comprising nano-silicon, a silicon-oxygen-lithium compound selected from the group consisting of Li2SiO3, Li4SiO4, Li2Si2O5, Li2Si3O7 and combinations thereof, silicon oxide and a carbon coating:
  wherein the silicon-oxygen-lithium compound is partially crystalline, the nano-silicon is dispersed in the silicon-oxygen-lithium compound to form fusion particles of the nano-silicon and the silicon-oxygen-lithium compound without clear interface between the nano-silicon and the silicon-oxygen-lithium compound, and the fusion particles are uniformly dispersed in the silicon oxide to form a composite particle wherein all directions of the fusion particles are surrounded by the silicon oxide matrix, forming a sea-island structure with the fusion particles as islands and with the silicon oxide as the sea, with the carbon coating coated on the surface of the composite particles; and
  wherein the nano-silicon and the silicon-oxygen-lithium compound are produced by in-situ redox growth;
  the preparation method comprises the following steps:
  (1) blending a carbon-coated silicon oxide and a lithium source by solid-phase mixing mode to implement primary treatment to form a pre-lithium precursor; wherein the lithium source undergoes a redox reaction with the silicon oxide in the interior of the carbon coating, and in-situ redox growth results in nano-silicon and a silicon-oxygen-lithium compound, and there is no clear interface between the nano-silicon and the silicon-oxygen- lithium compound; wherein the solid-phase mixing mode comprises any one selected from the group consisting of ball milling, VC mixing, fusion, mixing, kneading, dispersion, or a combination of at least two selected therefrom, and the solid-phase mixing mode is performed in vacuum condition;
  (2) heat-treating the pre-lithium precursor in vacuum or a non-oxidizing atmosphere to implement structural adjustment and secondary treatment to form the Si—O—C—Li composite according to any of claim 1, wherein the lithium source infiltrates into the interior of the carbon-coated silicon oxide to react in situ with the silicon oxide to produce nano-silicon and the Si—O—C—Li composite, wherein the temperature of the heat-treating is 160-1000° C., and the time for the heat-treating is 2-12 h;
  (3) subjecting the composite to surface treatment to compound the residual lithium or silicon-oxygen-lithium compound on the surface to the interior to obtain a surface- treated composite; the manner of compounding the residual lithium or the silicon-oxygen- lithium compound is any one selected from the group consisting of coating, cladding, film plating, spraying, and a combination of at least two selected therefrom; the manner of impurity removal is any one selected from the group consisting of washing, impregnation, and a combination of at least two selected therefrom, the washing or impregnation is carried out using an impurity removing solution.

7. The method according to claim 6, further comprising step (3) of subjecting the composite to surface treatment after the heat treatment of step (2) to obtain a surface-treated composite.

8. The method according to claim 6, wherein the lithium source in step (1) is any one selected from the group consisting of lithium-containing compound with strong alkalinity, lithium-containing compound with reducibility, elemental lithium, and a combination of at least two selected therefrom.

9. The method according to claim 6, wherein the carbon-coated silicon oxide in step (1) comprises a silicon oxide and a carbon coating coated on the surface of the silicon oxide.

10. The method according to claim 9, wherein the carbon coating comprises a carbon matrix and carbon nanotubes and/or graphene sheets embedded in the carbon matrix, and the carbon matrix is obtained by cracking an organic carbon source via carbonization treatment.

11. The method according to claim 10, wherein the temperature of the carbonization treatment is 500-1300° C.; the time for the carbonization treatment is 1-10 h.

12. The method according to claim 6, wherein in the carbon-coated silicon oxide in step (1), the mass ratio of the silicon oxide to the carbon coating is 100:(2-15);
  the mass ratio of the carbon-coated silicon oxide to the lithium source in step (1) is 1:(0.01-0.3).

13. The method according to claim 6, wherein the solid-phase mixing mode in step (1) comprises any one selected from the group consisting of ball milling, VC mixing, fusion, mixing, kneading, dispersion, and a combination of at least two selected therefrom;
  the time for the blending in step (1) is 2-12 h.

14. The method according to claim 6, wherein the non-oxidizing atmosphere in step (2) comprises any one selected from the group consisting of hydrogen atmosphere, nitrogen atmosphere, helium atmosphere, neon atmosphere, argon atmosphere, krypton atmosphere, xenon atmosphere, and a combination of at least two selected therefrom;
  the temperature of the heat-treating in step (2) is 160-1000° C.;
  the time for the heat-treating in step (2) is 2-12 h.

15. The method according to claim 6, wherein the manner of the surface treatment in step (3) comprises any one selected from the group consisting of impurity removal, cladding, surface functional group alteration, coating, film plating, spraying, and a combination of at least two selected therefrom.

16. A lithium-ion secondary battery comprising the composite according to claim 1.

* * * * *